UNITED STATES PATENT OFFICE.

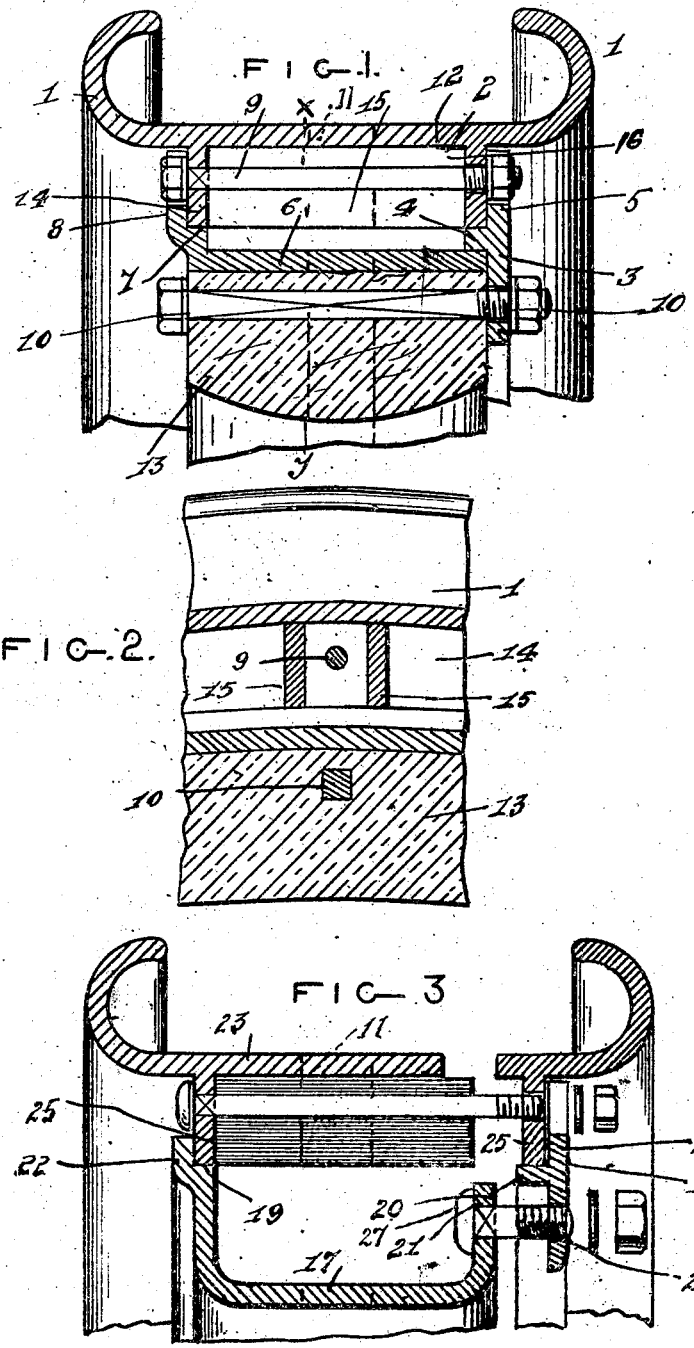

JAMES ASHTON, OF KILNAHUE RECTORY, GOREY, IRELAND.

DETACHABLE AND DIVISIBLE RIM FOR MOTOR-CARS AND OTHER VEHICLES.

1,041,567.

Specification of Letters Patent. Patented Oct. 15, 1912.

Application filed January 8, 1912. Serial No. 670,041.

*To all whom it may concern:*

Be it known that I, JAMES ASHTON, a subject of the King of Great Britain, residing at Kilnahue Rectory, Gorey, Ireland, have invented certain new and useful Improvements in Detachable and Divisible Rims for Motor-Cars and other Vehicles, of which the following is a specification, reference being had therein to the accompanying drawing.

This invention relates to improvements in and connected with detachable rims and tires for motor car and other wheels, the object being to provide an improved form of detachable rim, and when the rim is detached from the wheel, to further provide for the quick and easy detachment of the tire from the rim itself without stretching, distorting, or otherwise injuring the tire by levering it over the margin of the rim as is usually necessary.

In order that my invention may be fully understood, it will now be described with reference to the accompanying drawings.

Figure 1 is a cross section of detachable rim and felly of a wooden wheel, and Fig. 2 is a further sectional view on the dotted lines X Y, Fig. 1. Fig. 3 is a cross section showing adaption of my invention to wire wheels.

The drawings illustrate the method of attachment and detachment of (1) the rim and tire as a unit, to and from the wheel, and (2) the method of attachment and detachment of the outer cover and inner tube to and from the rim itself. The several parts are shown slightly separated for the sake of clearness.

In Figs. 1 and 2, 13 is a wooden felly of an ordinary artillery wheel. To the right hand side or outside of this felly a circular flange 3 is secured by means of a series of bolts 10 passing through the felly 13 and flange 3 at regular intervals, and holding the two securely together. On the inside of the flange 3 a circumferential tongue or projection 4 is placed so as to rest on the hoop or band 6 of the wooden wheel. On the left hand side or inside of the hoop or band 6 is a raised step 7 to be equal in height with the tongue or circumferential projection 4 of the flange 3. To the left hand side or inside of the step 7 the hoop is raised as at 8 to a somewhat greater height than the step 7 to prevent the detachable rim 1 from slipping off on the inside, as the upper portion 5 of the flange 3 will prevent the detachable rim 1 from slipping off on the outside. Thus the rim 1 is held firmly in position by its vertical and circumferential webs 14 resting on the step 7 and on the tongue or projection 4 and the upraised portion 8 of the hoop 6 and the upper portion 5 of the flange 3. By having the hoop 6 made with a step 7 and raised periphery on the inside as at 8 only one flange 3 will be necessary for detaching the rim 1. The rim is divided into two parts, a greater and a smaller, by a straight cut 12, and by placing the cut 12 on one side of the nipple hole or passage 11. Between the circumferential and vertical webs 14 cross webs 15 are welded on to the larger half of the rim 1, one on each side of the bolts 9, to take the strain when the two halves of the rim 1 are tightened together by the bolts 9. The right hand side 16 of the cross web 15 projects under the smaller half of the rim 1 as at 2 to form a guide in putting on the smaller half of the rim 1 and guide it accurately into its place. In detaching the rim 1 and the tire which it carries, it is only necessary to remove the flange 3 by taking off the series of nuts 10 and withdrawing the flange 3, which will allow the rim 1, together with the tire which it carries, to be withdrawn as a complete unit from the wheel, when another rim and tire may be put in their place.

Fig. 3 is a sectional view showing my invention applied to wire wheels. 17 is a steel or metallic fixed rim. The flange 18 will be similar to that used in connection with wooden wheels. The left hand or inner side of the metallic fixed rim 17 has a step 19 equal in height to the circumferential tongue or projection 20 of the flange 18. The tongue or projection 20 will rest on the upturned edge 21 of the metallic fixed rim 17. By the side of the step 19 and to the left of it the metallic fixed rim is raised higher than the step as at 22 to prevent the rim 23 from slipping off the fixed rim 17 on the inside, as the upper portion 24 of the flange 18 will prevent the rim 23 from slipping off on the right hand or outside. Thus the rim 23 is held firmly in position by its vertical and circumferential webs 25 resting on the step 19, and the tongue or projection 20, and between the upraised portion 22 of the metallic fixed rim 17 and the upper portion of the flange 18. By having the metallic fixed rim 17 made with a step 19 and raised periphery on the left or inside of the step as at 22, only one flange 18 will be necessary for attaching and detaching the rim 23. In order to secure this flange 18 in its place a series of short bolts 26 are placed on the right hand or outside of the metallic fixed rim 17 to be screwed in and riveted at the back as at 27 or otherwise secured as may be found desirable. The detachable rim for the wire wheel is made the same as for the wooden wheel.

Having now fully described the nature of my said invention, what I claim and desire to secure by Letters Patent is:—

In detachable rims for wheels of the character described, the combination with a wheel having a circumferential fixed rim with a stepped flange on one side projecting outwardly from said band, of an annular plate detachably secured to the wheel on the side opposite the flange and formed with a flange corresponding to and opposite the step of the first named flange, and a detachable rim having inwardly projecting flanges adapted respectively, to rest on said step and on the opposite corresponding flange of the annular plate, said plate being detachably secured to said wheel.

In testimony whereof I have affixed my signature in presence of two witnesses.

JAMES ASHTON.

Witnesses:
 JOSEPH PHELAN,
 DANIEL MAGUIRE.